US012249199B2

(12) United States Patent
Ailawadi et al.

(10) Patent No.: US 12,249,199 B2
(45) Date of Patent: Mar. 11, 2025

(54) METHOD AND APPARATUS FOR POLICY BASED ACCESS CONTROL

(71) Applicant: AlertEnterprise, Inc., Fremont, CA (US)

(72) Inventors: Yogesh Ailawadi, Fremont, CA (US); Vikas Chauhan, Mountain House, CA (US)

(73) Assignee: AlertEnterprise, Inc., Fremont, CA (US)

( * ) Notice: Subject to any disclaimer, the term of this patent is extended or adjusted under 35 U.S.C. 154(b) by 0 days.

(21) Appl. No.: 18/481,763

(22) Filed: Oct. 5, 2023

(65) Prior Publication Data

US 2024/0046723 A1 Feb. 8, 2024

Related U.S. Application Data

(63) Continuation of application No. 18/158,265, filed on Jan. 23, 2023, now Pat. No. 11,783,646.

(60) Provisional application No. 63/321,959, filed on Mar. 21, 2022.

(51) Int. Cl.
*G07C 9/00* (2020.01)
*G07C 9/26* (2020.01)

(52) U.S. Cl.
CPC .......... *G07C 9/00174* (2013.01); *G07C 9/26* (2020.01); *G07C 2009/00976* (2013.01); *G07C 2209/04* (2013.01); *G07C 2209/08* (2013.01)

(58) Field of Classification Search
CPC ................. G07C 9/00174; G07C 9/26; G07C 2009/00976; G07C 2209/04; G07C 2209/08
See application file for complete search history.

(56) References Cited

U.S. PATENT DOCUMENTS

| 10,417,850 | B2 * | 9/2019 | Johnson | ................. G06Q 10/00 |
| 2020/0020182 | A1 | 1/2020 | Florentino et al. | |
| 2021/0074092 | A1 | 3/2021 | Davis et al. | |
| 2023/0072114 | A1 * | 3/2023 | Larsson | ............. G07C 9/00309 |

* cited by examiner

*Primary Examiner* — Daniell L Negron
(74) *Attorney, Agent, or Firm* — PERKINS COIE LLP; Michael A. Glenn

(57) ABSTRACT

An authorization approach to physical access uses identity attributes, doors/readers attributes, time of the day, and policies to determine access rights to facilities and physical spaces in real-time, based on three criteria: who, when, and what. Embodiments address the constantly changing physical access needs of companies as those needs evolve.

7 Claims, 12 Drawing Sheets

Sample List of available Policy Rules out of the box (more can be added) –
- Unapproved Cardholders
- Unapproved Access
- Critical Door Access
- Perimeter Door Access
- Unvaccinated Cardholders
- Expired Cardholder Training
- High risk Cardholders
- Maternity Rooms Access
- ADA Compliant Door Access
- GYM Access
- Parking Garage Access

FIG. 7

| Overriding Door Authorization Policy | Employee | Contractor | Vendor/Temp |
|---|---|---|---|
| Unapproved Cardholders Rule | ✗ | ✗ | ✗ |
| Critical Doors Access Rule | ⊘🕐 | ⊘🕐 | 🕐⊘ |
| General Doors Access Rule | | ⊘🕐 | ⊘🕐 |
| Expired/Un-Vaccinated all doors Rule | ✗ | ✗ | ✗ |
| Expired Training of Critical Doors Rule | ✗ | ✗ | ✗ |
| High Risk Cardholder at Critical Doors Rule | ✗ | ✗ | ✗ |
| High Risk Cardholder at General Doors Rule | 🔵 | 🔵 | ✗ |
| Temp Badge expired more than 24 hours at critical door Rule | | ✗ | ✗ |
| Critical door used by conflicting business units Identity Rule | ✗ | ✗ | ✗ |

✗ Access Denied   🔵 Enable 2FA   🕐 Shift Hours   ⊘ Off-Shift Hours

FIG. 8

METHOD AND APPARATUS FOR POLICY BASED ACCESS CONTROL

CROSS-REFERENCE TO RELATED APPLICATIONS

This application is a continuation of U.S. patent application Ser. No. 18/158,265, titled METHOD AND APPARATUS FOR POLICY BASED ACCESS CONTROL, and filed on Jan. 23, 2023, which claims priority to U.S. Provisional Patent Application Ser. No. 63/321,959, titled METHOD AND APPARATUS FOR POLICY BASED ACCESS CONTROL, and filed on Mar. 21, 2022, which applications are incorporated by reference herein in their entirety by this reference thereto.

FIELD

This invention relates generally to the field of services and devices for physical access. More specifically, this invention relates to a zero-trust service for physical access to facilities and elements.

BACKGROUND

FIG. 1 shows how the physical access industry has evolved for credentials 102 that have been used to open a door in the past. Examples 102 include a person's badge, their biometrics, anything that the industry has. The industry has gone through innovation cycles for over a couple of decades, starting with a very small plastic card to very sophisticated biometrics, two-factor authentication, for example. These types of credentials 102 are used to open doors for someone. Such information, e.g. authorization logic 104, was stored on an access control server and local database storage 106 and the controller/panel 105 helps to transmit the signal from an access point 107 such as a door to the backend access control server. The access control server and panels are provided by many different hardware vendors. The access control server and local database storage stores the information about the users and which doors they can open, in the form of 'Access/Clearance.' 108 Such information is sent to the server and database either by manually by using a user interface of the server and entering the information or by some device or service that is pushing the information, called provisioning. The controller's box helps to open the door based on User→Access information is stored in a physical access control database. This is called Role-based Access Control (RBAC). This is the same process that was used over two decades and is still used today. Nothing has changed on this side of the security industry if the person still can/should be able to open the door.

FIG. 2 shows how security has two pillars in the process, according to the prior art. They are authentication 202 and authorization 204. In this example, authentication means to prove who you are. Authorization means, can you open this door or any other element needing physical security. For example, assuming a very sophisticated credential, e.g. a biometric credential, the system can check a person's photo on their phone and determine and confirm the person's identity. However, whether this person should open the door requires authorization 204.

Some issues with authorization 204 in physical access control systems may include the following:

There could be stale information about the user having access maybe three weeks ago or three months ago or maybe three years ago.

Someone can access these servers because there are many system engineers that have access to such servers. Persons who maintain that hardware can easily manipulate that information.

At any time, it is possible that no one would know that someone entered a rogue account. For instance, someone could create one more extra badge for a particular user in the access control system and no one else would not know.

Labor intensive, another potential issue, is whenever a person needs access to some site or some facility, e.g. the person is traveling to a different site or a person's department got changed by human resources, and someone manually opens that access control system, to give that person access. As another example, assume that some government or some state officer says only persons who are vaccinated are allowed to come into office. Assuming one facility has 1000 people working in it, then the business has to open 1000 profiles in that system to disable everybody's badge. Then, suppose that after one day 100 people got vaccinated. The business administrators must again open 100 people's profiles, enable their badge, and such administrators keep checking the statuses of vaccinations. Thus, today's security functions can be very labor intensive.

Another issue is too much access. As an example, suppose a particular warehouse has people working in shifts, e.g., from 8 to 5 in a 24 by 7 warehouse. Such people can work different shifts, e.g. two weeks in a day shift, two weeks in the evening shift. The access control systems have to be current and have to reflect those shifts. However, the access control systems might have only a limited set of memory and cannot accommodate, for example, that a particular employee has access from 8 to 5, Monday to Thursday for three weeks, and then 12 to 8 for one week. What the warehouses do is they end up giving 24 by 7 access to everybody because they do not want to or cannot deal with that problem. Effectively, the warehouse access control systems give too much 24 by 7 access wherever there are such shifts.

Another example is at airports with baggage handlers and crew members. The airport is working about 18 hours out of 24 hours, but. the access control system is having 24 by 7 access, even for the person coming to work at the airport just for 5 hours. Thus, there is too much access people are having right now that is a 24 by 7 access.

Another issue is no guarantee of business policy. No guarantee of business policy is where, for example, an organization has a policy that if people are going into a nuclear power plant, they must have the safety procedure training completed. The person takes the training and goes into the power plant. But what if the training is expired and new training has come in. Who is taking off that person's access? There can be millions and millions of dollars of fines. Thus, someone has to manually review or push the updated information.

Another issue is insufficient and an incomplete audit. Insufficient and incomplete audit is that while there are some audit processes in those systems that handle who has been added access who has been removed access, such processes still are not at the level where auditors can be satisfied. Audit information is present and is at a high level.

These are some of the challenges in state-of-the-art systems.

SUMMARY

Embodiments of the invention use an authorization approach to physical access composed of using identity attributes, doors/readers attributes, time of the day, and policies to determine access rights to facilities and physical spaces in real-time, based on three criteria: who, when, and what. Techniques described herein address the constantly changing physical access needs of companies as they evolve.

BRIEF DESCRIPTION OF THE DRAWINGS

FIG. 7 shows a sample list of available policy rules out of the box, according to an embodiment;

FIG. 8 is a sample GUI summary view of rules, according to an embodiment;

DETAILED DESCRIPTION

Embodiments of the invention use a policy-based authorization approach to physical access composed of using identity attributes, access point, e.g. doors/readers, attributes, time of the day, and rules to determine access rights to facilities and physical spaces in real-time, based on three criteria: who, when, and what, in real-time and each time access is requested by presenting the credential at any kind of door or spaces. Techniques described herein address the constantly changing physical access needs of companies as they evolve.

According to current processes and elements, the door or physical space that a user, e.g. a cardholder, is permitted to access is stored in a database with direct relationship to such user. For example—

User A→Lobby Access (the access name, also called Clearance or Role)

User A→Floor3 Access (the access name, also called Clearance or Role)

User A is assigned Lobby Access and Floor3 Access. Here, access is provided to a combination of facility doors. For instance, Lobby Access is associated with the Front Door and the Back Door.

In accordance with embodiments of the invention described herein, a new process is introduced. In such embodiments, the user is not tied to the access name. For example, whether User A can open the front door is based on attributes and the policy defined for both User A and for the front door that are evaluated in real-time, each time the user requests access by presenting credential at the door. As described in detail below, the policy is a combination of identity and/or user, door attributes, and the time frame during which a transaction is happening.

Figure 1:
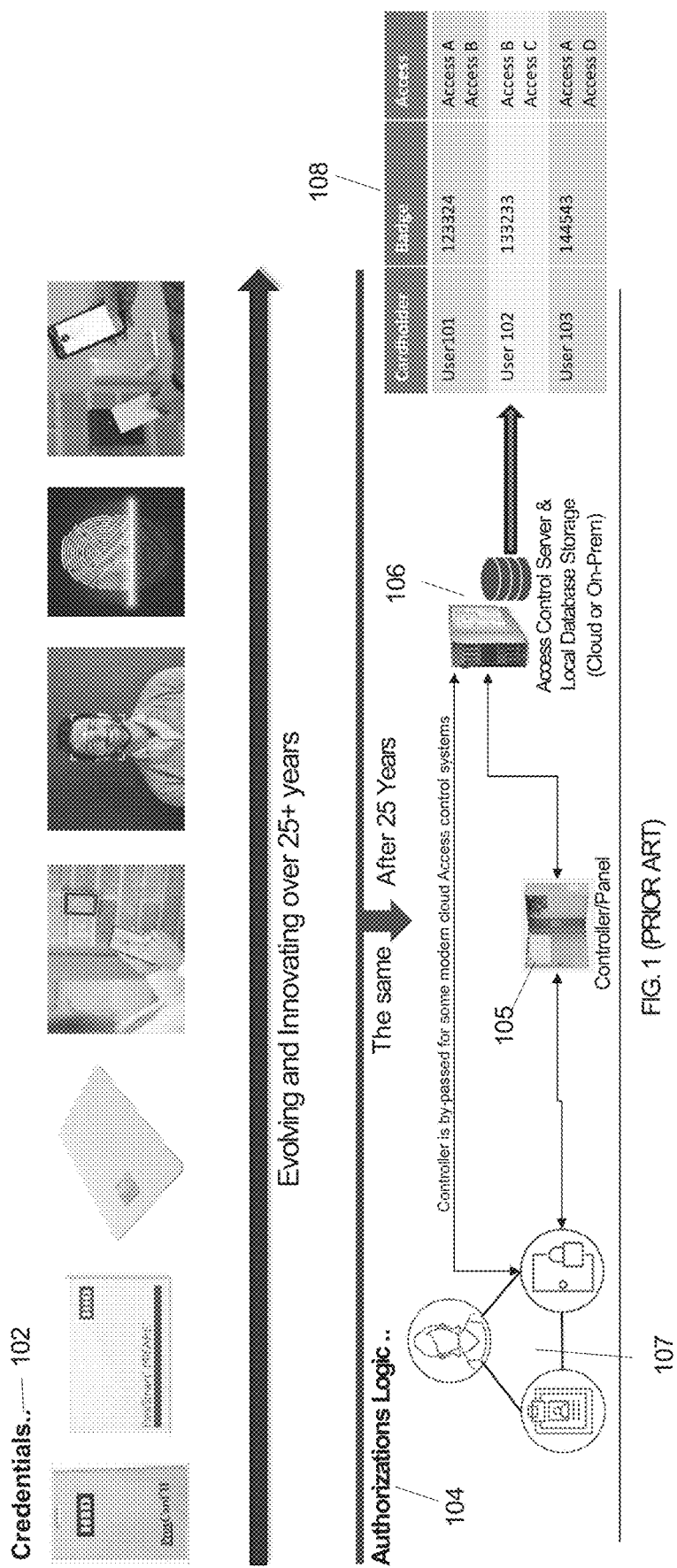
FIG. 1 is a schematic diagram showing how the physical security credential industry has evolved in the last 25 years, according to the prior art.
Figure 2:
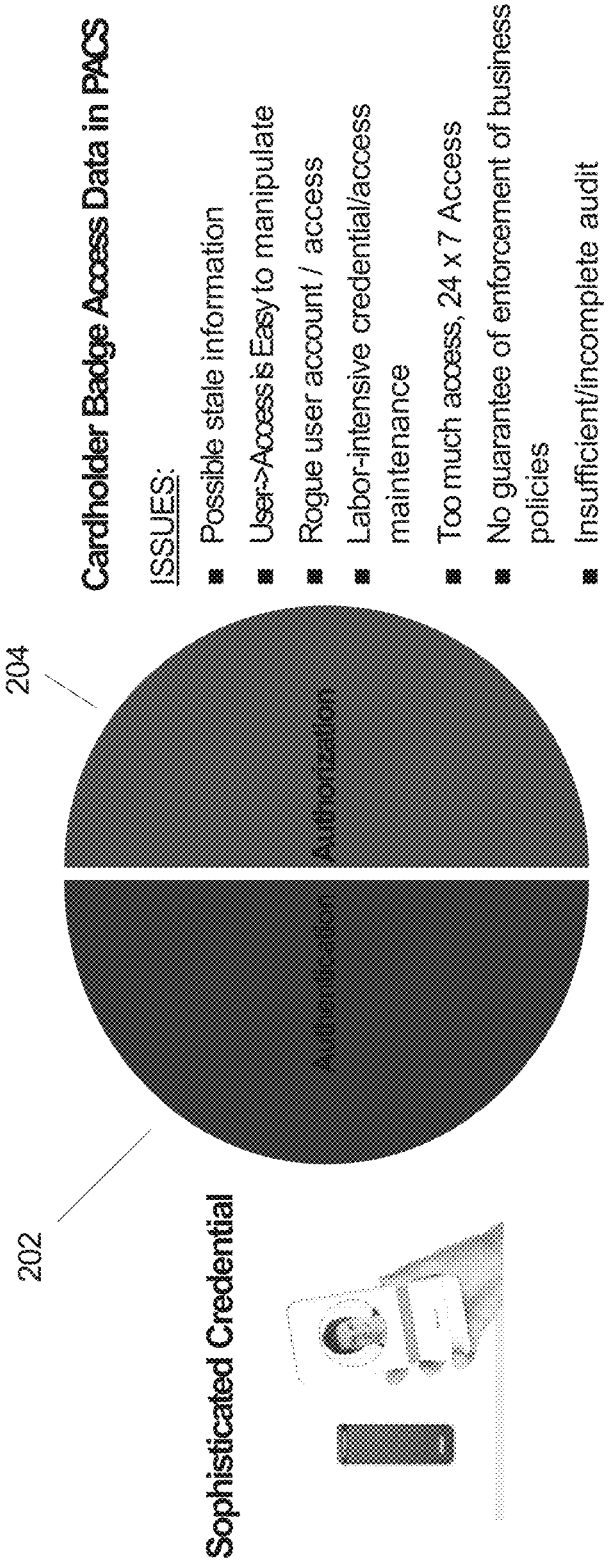
FIG. 2 is a schematic diagram showing the present state of physical security functions, according to the prior art.
Figure 3:
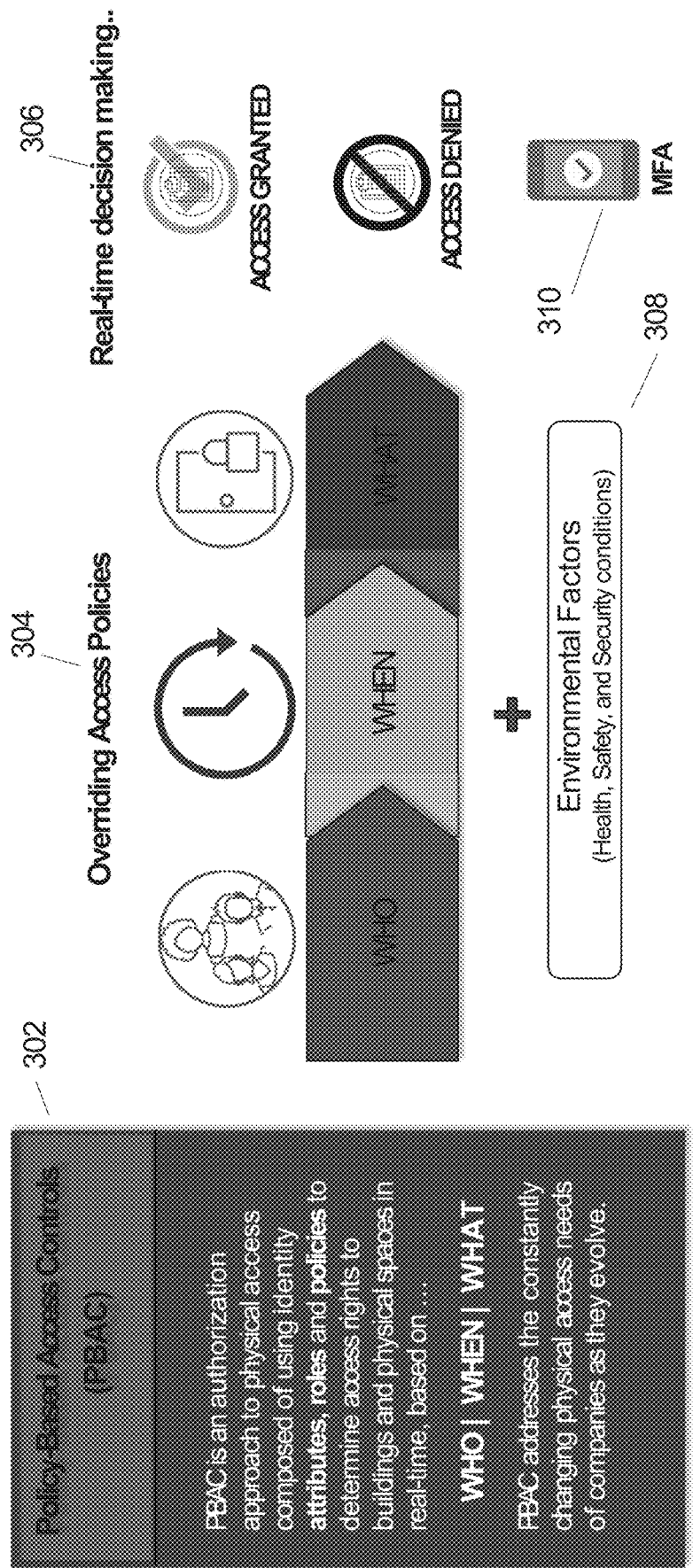
FIG. 3 is a schematic diagram showing physical access control with real-time policy evaluation, according to an embodiment.

An embodiment is described with reference to FIG. 3, which is a schematic diagram showing physical access control with real-time policy evaluation. In an embodiment, policy-based access controls (PBAC) 302 is policy-based authorization approach to physical access composed of using identity attributes, door/reader attributes, and policies to determine access rights to facilities and physical spaces in near real-time, based on WHO|WHEN|WHAT. The data of identity attributes, door/reader attributes, and policies are received in a fraction of a second, in near real-time. Such data, e.g. the who, when, and what, are nearly immediately obtained from the identity store each time access is requested. PBAC addresses the constantly changing physical access needs of companies as they evolve. The system is configured to determine who, when, and what, using environmental factors 308 and multi-factor authentication 310, to process such information against policies, and use the processed information to override access policies 304. Such determination of information and overriding of policy is performed by the system in real-time, e.g. processing real-time decision making, e.g. to grant access or to deny access 306.

Rather than relying on the user to access information stored in an access control server, embodiments check which attributes that contribute to that information or contribute to that access. For example, an electrical engineer needs access to electrical sites. Suppose that the electrical engineer, entering the facility for example, conveys three pieces of information, who they are; their working shift, e.g. 8 to 5 being the shift hours are in the HR system; and that they are opening a door that leads their job or duties on day-to-day basis. The three bits of information are who, when, and what 302.

In an embodiment, the system is configured to evaluate these three attributes in real time. For instance, every time someone is swiping a badge at the door, the system can find out the who, when, and what. The system is configured to determine whether the person should access the door or not. Rather than relying on information where it indicates that the user can access door A, the system is configured to determine why the person is accessing door A. The system checks the policy and if it detects any problem with any policy, the system denies access 304. The shift is that in real-time the system enforces policies every time someone tries to access any door or obtain physical access.

In an embodiment, the system processes environmental factors 308. For example, suppose a gas leak occurs in a high rise building in New York, which is a health hazard. Suppose that there are 5,000 people working in that big high rise. No one should come and open the office. The building managers must disable everyone's access and lock all the doors. Suppose further that the fire is contained in floors 3 to 5. Those are the floors to which no one should go. Thus, in an embodiment, the system can be configured with an added building policy. Thus, if the building is deemed unhealthy, the added policy can ensure that no one's swipe at the door can open the door. Innovatively, the configured system, for those floors or for the building, requires update just one flag and everything is done. In contrast to prior art systems, the system does not require users to change access manually on hundreds and hundreds of cardholders. In another embodiment and as another example, the fire department badge could open the door because they are going in for emergency purposes, whereas others' badges are prevented from opening the door. That is, in this embodiment, there is a policy that indicates if the person is from fire department, let the door be open for them.

Figure 4:
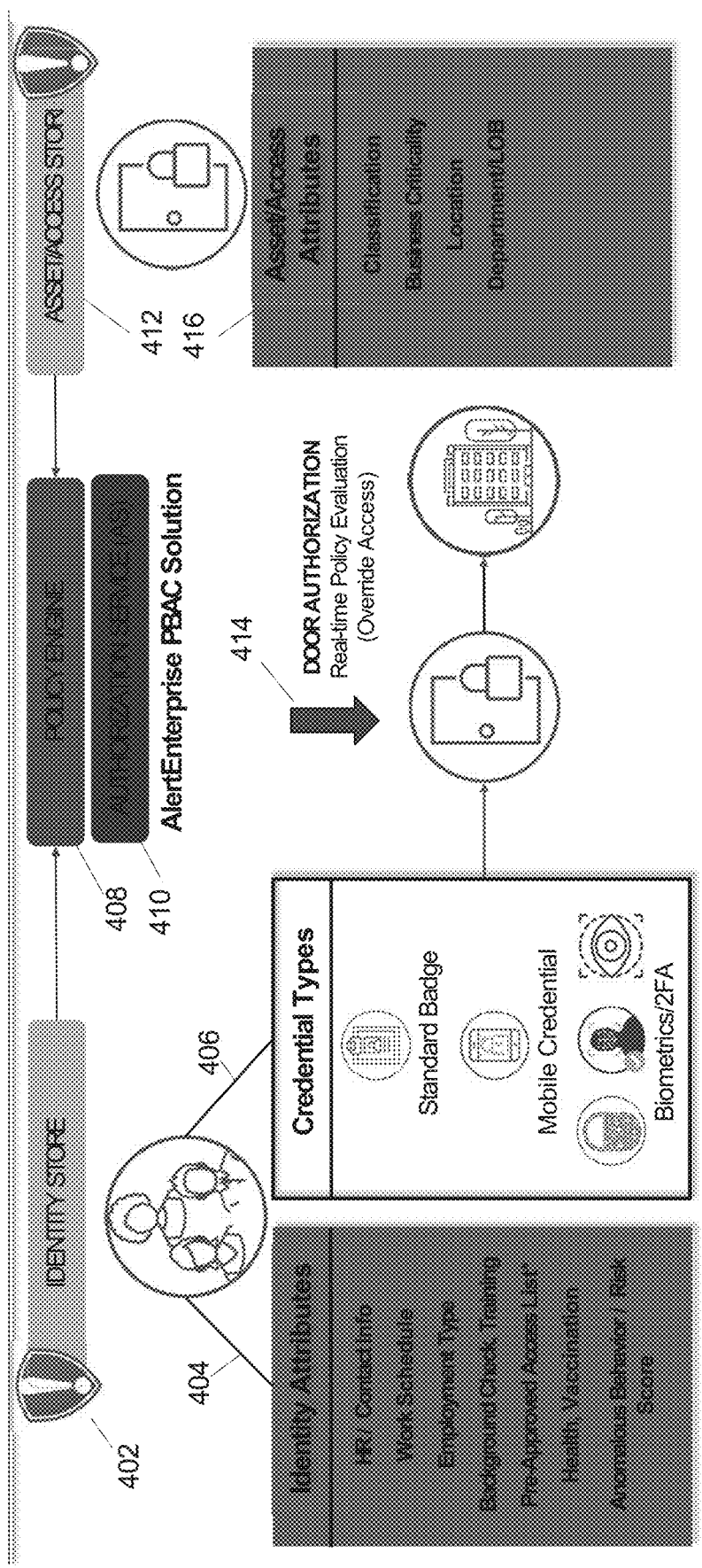
FIG. 4 is a schematic diagram showing policy-based access control, according to an embodiment.

An embodiment is described with reference to FIG. 4, a schematic diagram showing an exemplary implementation of a policy-based access control architecture. In FIG. 4, the system includes an identity store 402, which is a store of all the people, e.g. employees within a business, with all the possible attributes, e.g. attributes of such employees 404. Attributes may be received from HR system attributes. As well, the system can directly pull information from the background, a check system, or health or vaccination system, as illustrative examples. In an embodiment, the system receives the following identity attributes: HR/Contact Info; Work Schedule; Employment Type; Background Check, Training; Pre-Approved Access List; Health, Vaccination; and Anomalous Behavior/Risk Score.

In an embodiment, the system processes credential types 406, such as but not limited to standard badges, mobile credentials, and biometrics and/or multi-factor authentication technology.

Further, in accordance with an embodiment, users can create a policy engine, and the policy engine 408 has a feature, a connection with the authorization service 410. In an embodiment, an edge device is used as the reader, which is hooked up at the door, which helps open the door. Thus, door authorization 414 is provided by real-time policy evaluation, which can override access through the door or with a physical space.

Embodiments herein include an asset and/or access store 412, which includes associated attributes 416 that include but are not limited to classification, business criticality, location, and department/LOB.

In an embodiment, the system incorporates hardware that has been manufactured by a third-party. Embodiments herein generate and provide the authorization service. The authorization service (AS) technically is a computer which controls such policies. The authorization service is code that cannot be applied until the system is integrated with a suitable reader or suitable hardware technology in the door. Such hardware can be provided by third-party partners. Nonlimiting examples of such partners include those in the biometric devices and technologies space or the touchless identity solutions. In an embodiment, such partners provide the piece of hardware, but open a small hook for the innovative software to be interjected. Hardware is a facilitator.

An embodiment is described with reference to FIG. 5, which is a schematic diagram of two hardware configurations. The first scenario depicts the process using a standard legacy Wiegand reader 510. The system is configured to process the policy engine, using the identify store, and executing the authorization server 516, with respect to the Wiegand reader 510. The outcome of such process 516 can override the integrated control panel 512 that is communicably connected to the physical access control servers 514, to open or deny opening of a door or access to a physical space per policy 524.

Similarly, the second scenario depicts the process using any IP (internet protocol) enabled readers from hardware manufacturers 518, in lieu of Wiegand readers. The system is configured to process the policy engine, using the identify store, and executing the authorization server 516, with respect to the IP enabled readers 518. The outcome of such process 516 can override the integrated control panel 520 that is communicably connected to the physical access control servers 522, to open or deny opening of a door or access to a physical space per policy 524.

An embodiment is described with reference to FIG. 6, which is a schematic diagram of how to configure policy enforcement. The system is configured so that a user can select a policy rule, a door/area type, an identity type, a schedule, and an action. The door/area type can include but is not limited to perimeter, priority areas, restricted areas, parking garage, GYM, and all access. The identity types can include but are not limited to employee, contractor, temp/vendor, and all cardholders. The schedule can include but is not limited to shift hours, off-shift hours, and always. The action can be but is not limited to deny access and enable multi-factor, e.g. two-factor, authentication. Such parameters are provided as input to configure the policy, which can have rules that include but are not limited to unapproved cardholders and critical door access. Further, the policy rules include but are not limited to the attributes as follows, door/access type, identity type, schedule, and action, which are populated when the policy is configured.

An embodiment is described with reference to FIG. 7, which is a sample list of available policy rules that are pre-installed in the system. Preconfigured policy rules that are provided pre-installed in accordance with embodiments herein include but are not limited to unapproved cardholders, unapproved access, critical door access, perimeter door access, unvaccinated cardholders, expired cardholder training, high risk cardholders, maternity rooms access, ADA compliant door access, GYM access, and parking garage access.

An embodiment is described with reference to FIG. 8, which shows a sample GUI summary view of rules. Specific rules are shown and for each rule there are roles that can be associated with various actions such as but not limited to access denied, enable multi-factor, e.g. two-factor, authentication, allow access during specific shift hours, and allow access during specific non-shift hours. Examples of roles include but are not limited to employee, contractor, and vendor/temp. Examples of overriding door authorization policies include but are not limited to unapproved card holders' rule, critical doors access rule, general doors access rule, expired/un-vaccinated all doors rule, expired training at critical doors rule, high risk cardholder at critical doors rule, high risk cardholder at general door rule, temp badge issued more than 24 hours at critical door rule, and critical door used by conflicting business unit's identity rule.

Figure 9:
FIG. 9 is a sample GUI of a policy summary view, according to an embodiment.

An embodiment is described with reference to FIG. 9, which shows a sample GUI of a policy summary view. The GUI accesses the appropriate data and displays the data including, but not limited to the rule name, the description of the rule, the type of rule, the condition of the rule, and the status of the rule.

Figure 10:
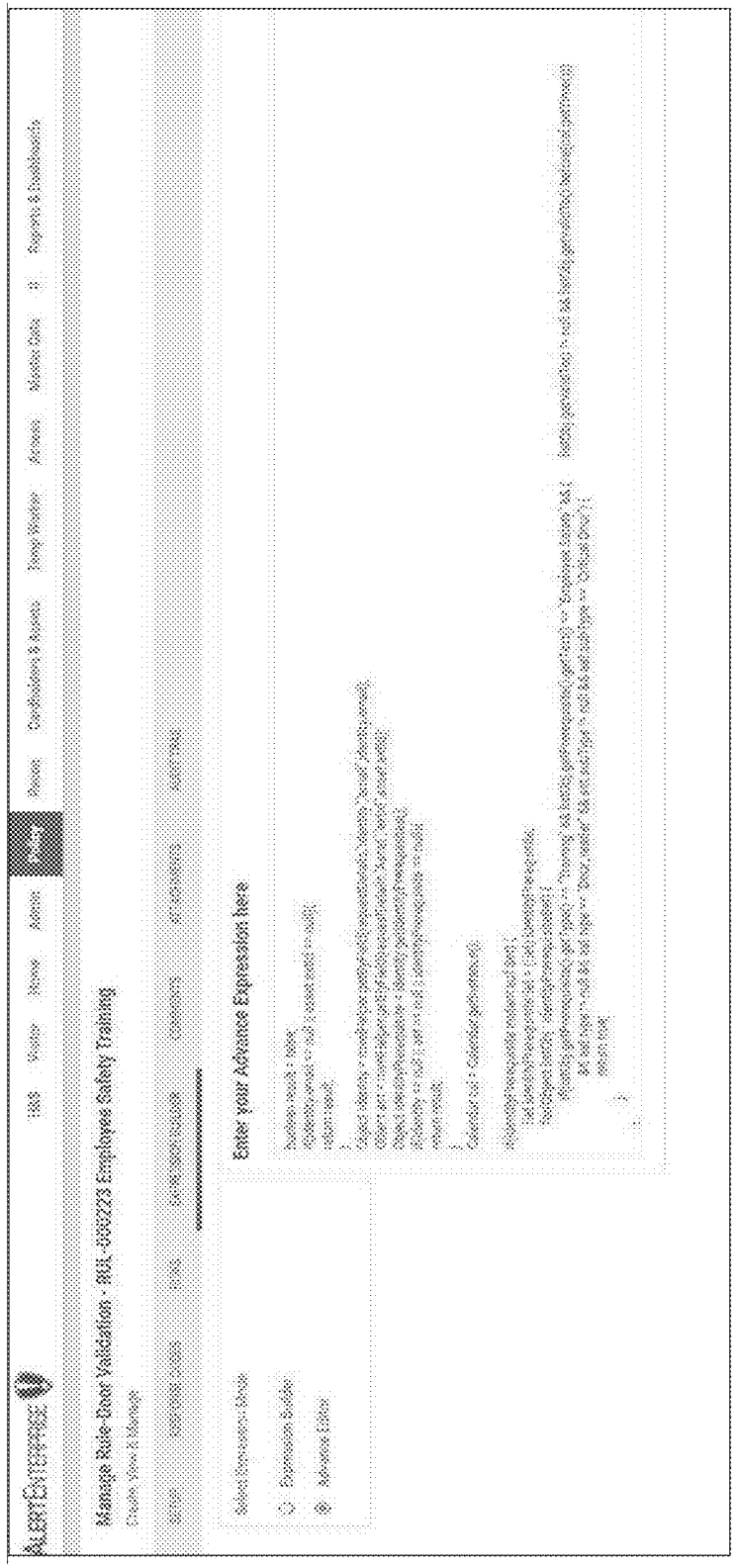
FIG. 10 is a schematic diagram of a sample policy definition code for expired training policy rule, according to an embodiment.

An embodiment is described with reference to FIG. 10, which is a schematic diagram of a sample policy definition code for expired training policy rule. More specifically, a portion of code defining the rule for employee safety training is shown, for illustrative purposes.

An embodiment is described with reference to FIG. 11, which is a schematic diagram of a sample solution deployment. Data from computer systems 1102 are input into the innovative identity store/policy engine/authorization service 1104. The output of such innovative service (real-time policy evaluation) is transmitted to the access control server 1109 in the customer facility 1106, which instructs the panel 1108 to control the doors 1107 (or physical spaces) to open or to deny access. Example of customer systems include but are not limited to HR/IAM/AD system vaccination information, vendor/contractor/tenant system, job schedule, learning management, and watchlist/high risk background checks.

Exemplary Embodiments

In an embodiment, a screen is provided to the user where the user can select the rule and which kind of door or area to which the rule applies. For example, the door could be a perimeter door, a priority door, restricted or a parking garage where the user wants to apply that policy. The user's policy could be different for a facility perimeter or versus a restricted area. The system is configured to help determine where to apply that policy, e.g. is it an employee, contractors, is it for temporary work, for a vendor or for everyone. Similarly, the system is configured to designate when this policy should trigger, e.g. for which shift hours. Then the user can configure the kind of actions they desire.

As an example embodiment, the system is configured to apply multi-factor, e.g. two-factor, authentication. Suppose the user swipes their badge. The door can send a token to their mobile phone to confirm the person's identity. The phone is a pre-registered phone and the user can say yes or, in another configuration, allow the user to show their photo, which can be captured as well. Then the system opens the door for the user. Now, assume as an example that 100 people are going through that door. Every user does the same thing.

To improve computer processing efficiency and consumer privacy and safety, the system, which normally can be configured to allow a person who has 8 to 5 shift hours every day and require the person to enable two-factor authentication, the system can do the following: Rather just always enable two-factor authentication, such feature can be required only if the person is coming in the night, when they are not supposed to come. Thus, the innovation adds intelligence to the policy.

In an embodiment, the policy engine/authorization server, e.g. 408 and 410 in FIG. 4, process checks a person's face via two-factor authentication and the partner's hardware is configured to open the door, with the intelligence provided by the policy engine/authorization server processors, e.g. 408, 410.

Figure 5:
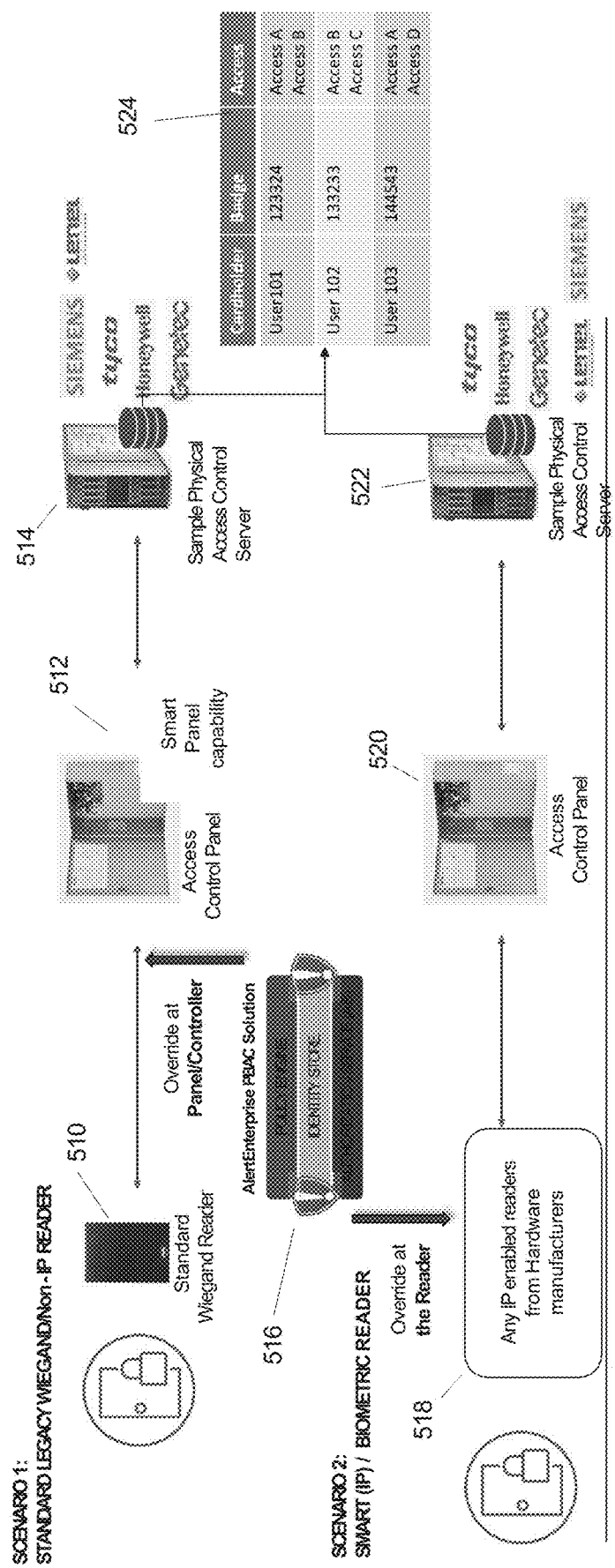
FIG. 5 is a schematic diagram of two hardware configurations, according to an embodiment.

In an embodiment, the location where the policies are stored is the physical access control server, e.g. 514 or 522 in FIG. 5.

In an embodiment, the place where a person swipes the badge is a reader, e.g. 510, that is connected to a central facility, e.g. 512, referred to as an access control panel, where the partner hardware can be installed. The partner's device (shown as part of 512) is added to this access control panel. Such added device is connected to the authorization service or policy engine, e.g. 516. That is, the new, small piece of hardware that is capable of talking to the policy engine authorization service.

In accordance with an embodiment, there is another way of providing the access service, which is shown in scenario number 2 of FIG. 5. Rather than having a standard Wiegand reader, the customer can have a smart reader, e.g. 518, such as a smart IP or biometric reader. The reader has built in capability to talk to the policy engine. The configured system does not require that hardware be added at the access control panel level.

In an embodiment, once the installation is done, user access is controlled by the policy engine/authorization service piece.

In an embodiment, the components of the innovation reside either on the Internet, or some network location within customer landscapes. In another embodiment, the policy engine or authorization service can be in the cloud. That is, such application can be deployed anywhere.

Figure 11:
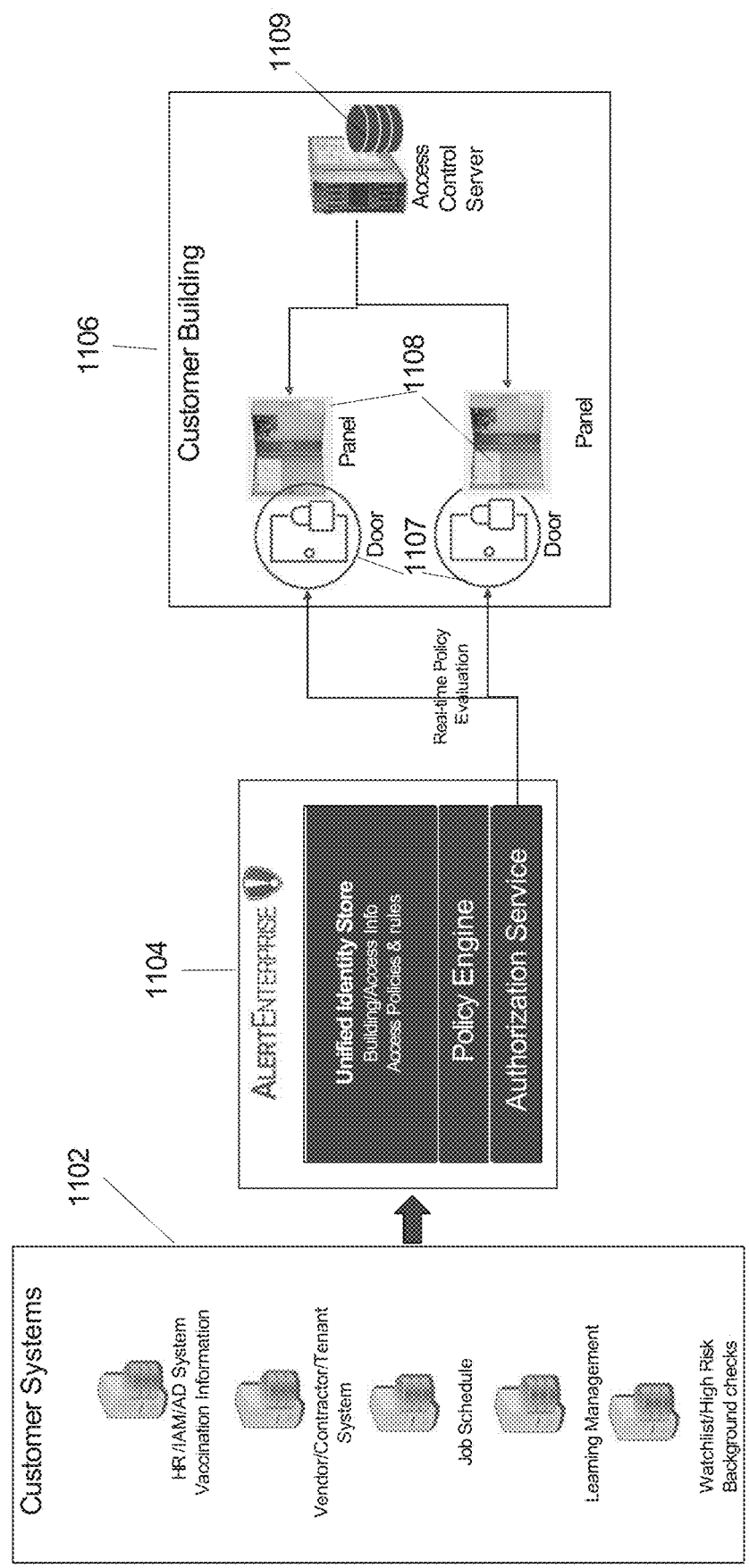
FIG. 11 is a schematic diagram of a sample solution deployment, according to an embodiment.

In an embodiment, the policy engine/authorization service component, e.g. 1104 of FIG. 11, is communicably connected to and integrated with many systems, e.g. customer systems 1102, where raw information is stored. Examples of information on the customer systems can include but are not limited to the HR system that is responsible for providing a person's base location, i.e. where they work. It can be responsible to give component 1104 a background check flag or a training flag, or there may be different systems for background checks or training scores. Another system may store the work schedules, including the work shifts. That is, the system is configured to pull, e.g. by 1104, such flags or information from those systems 1102.

In an embodiment, the information can be received or pulled by 1104 on regular intervals and some are real-time pushed or pulled. The frequency of obtaining data can depend upon the capability of that external system, e.g. in 1102. For instance, some informational data are pushed to the policy engine/AS, e.g. 1104, as soon as it gets reflected automatically. As another example, for a third-party background check, policy engine/AS can talk to a service, which processes real-time analysis. If someone is in a Federal, criminal history check, such data is in a third-party database. Thus, embodiments herein are configured to enable the policy engine/AS, e.g. 1104, to talk to all the systems in customer systems, e.g. 1102, depending on the needs for security. Also, the system is configured to work with many different vendors. Thus, there is more than one standard way of configuration; i.e. there is the flexibility of the innovation that can talk to multiple systems. The system, e.g. 1104, can fetch data from multiple system and apply policy on those.

In an embodiment, identity attributes 404 (see FIG. 4) also can include information on a customer with a non-HR source, which is a contractor's vendor system. Such information can reflect temporary workers or visitors, the data of whom also get added to the systems.

In an embodiment, the policy engine/AS, e.g. 408 and 410, can include risk and policy engine workflow.

It should be appreciated that currently, a person's badge is working with what has been hard coded at the door. However, the innovation herein changes that paradigm because it evaluates conditions in real-time. The process for how someone gets access to any door or physical space is changed.

In an embodiment, the identity store, e.g. 402, can be updated as follows. If someone comes to work with a company, they can be put in the identity store. At the access store, e.g. 412, such data are changed on the fly on a regular basis. An embodiment contemplates using a dashboard for changing these two stores. The policy store administrators can fine tune the flags and the policies.

Figure 6:
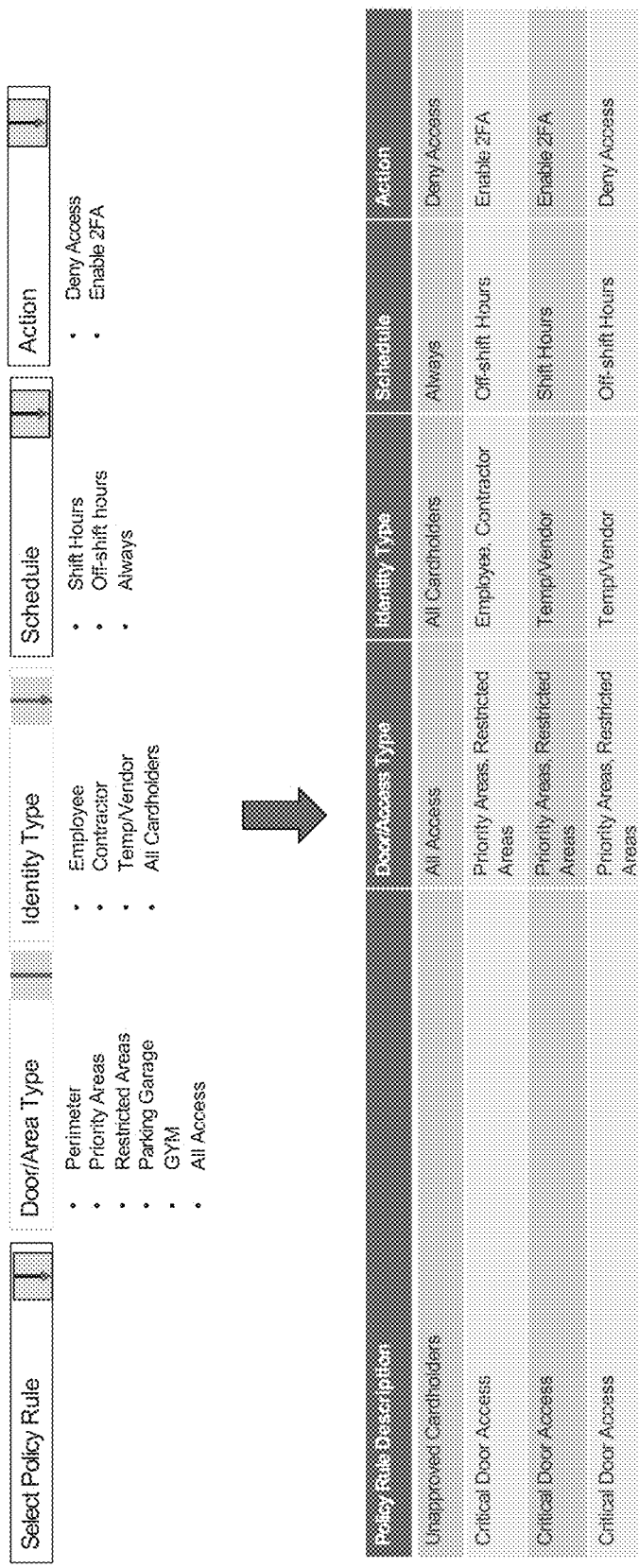
FIG. 6 is a schematic diagram of how to configure policy enforcement, according to an embodiment.

An embodiment provides a dashboard for a user to read policy, e.g. FIG. 6 and FIG. 8. A user can see how their security is working as of today after implementing this policy-based access. For example, if a facility has an unapproved cardholder, it means that someone may have a valid badge, but that the system should deny their access. The critical access door rule can cover a data center, a nuclear power plant, or an airport terminal, for example, that persons are trying to access.

In an embodiment, a policy can be changed on day-to-day basis. For example, suppose that there is no more vaccination mandate. A user can simply disable the appropriate rule and allow access.

It should be appreciated that in accordance with embodiments herein, there are many other policies, such as but not limited to a parking policy, a hallway policy, and a camera policy. The system is configured to control general access door or different types of doors. For instance, there could be the door to the server room, which is a higher level of security than the door to the cafeteria. Another example is a passageway and that a person cannot walk down the passageway unless they have certain authorization.

An Example Machine Overview

Figure 12:
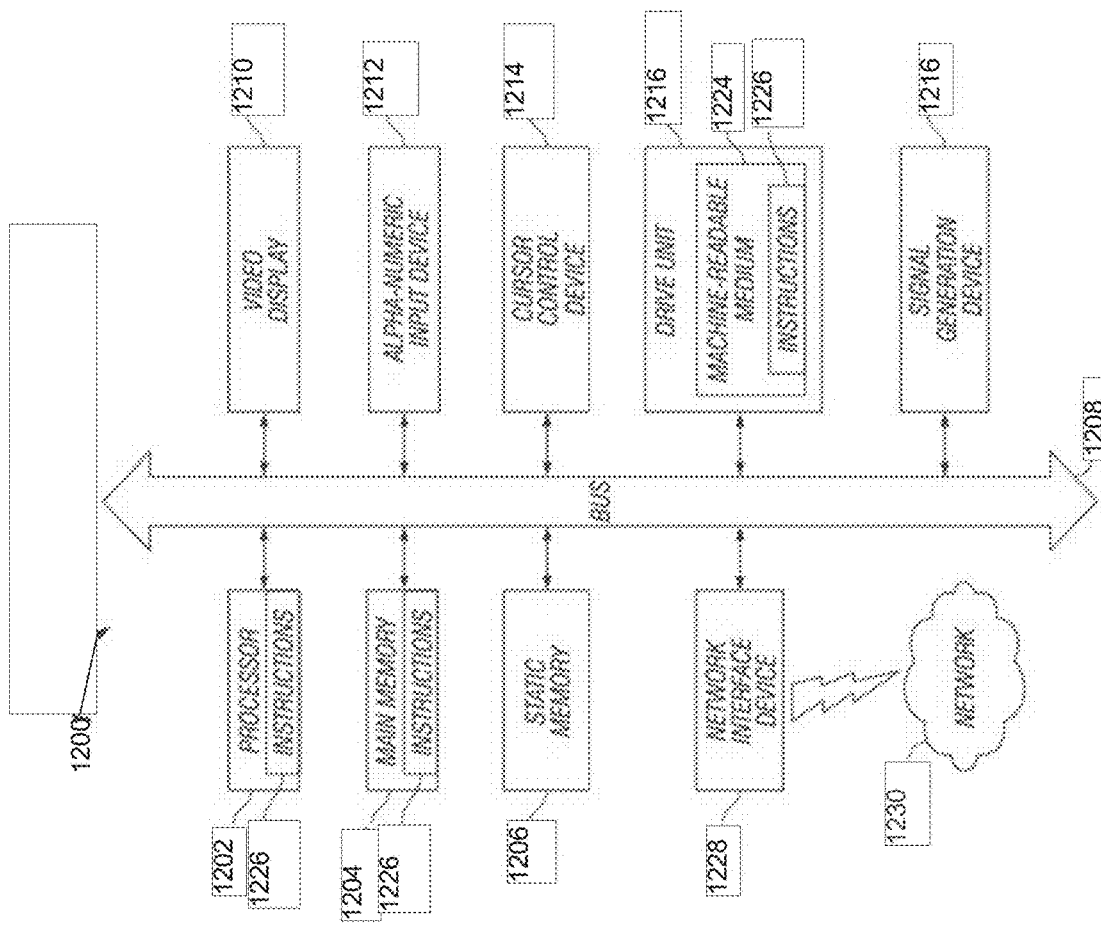
FIG. 12 is a block schematic diagram of a system in the exemplary form of a computer system according to an embodiment.

FIG. 12 is a block schematic diagram of a system in the exemplary form of a computer system 1200 within which a set of instructions for causing the system to perform any one of the foregoing methodologies may be executed. In alternative embodiments, the system may comprise a network router, a network switch, a network bridge, personal digital assistant (PDA), a cellular telephone, a Web appliance, or any system capable of executing a sequence of instructions that specify actions to be taken by that system.

The computer system 1200 includes a processor 1202, a main memory 1204 and a static memory 1206, which communicate with each other via a bus 1208. The computer system 1200 may further include a display unit 1210, for example, a liquid crystal display (LCD) or a cathode ray tube (CRT). The computer system 1200 also includes an alphanumeric input device 1212, for example, a keyboard; a cursor control device 1214, for example, a mouse; a disk drive unit 1216, a signal generation device 1218, for example, a speaker, and a network interface device 1228.

The disk drive unit 1216 includes a machine-readable medium 1224 on which is stored a set of executable instructions, i.e. software, 1226 embodying any, or all, of the methodologies described herein below. The software 1226 is also shown to reside, completely or at least partially, within the main memory 1204 and/or within the processor 1202. The software 1226 may further be transmitted or received over a network 1230 by means of a network interface device 1228.

In contrast to the system 1200 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g. a computer. For example, a machine-readable medium includes read-only memory (ROM); random access memory (RAM); magnetic disk storage media; optical storage media; flash memory devices; electrical, optical, acoustical, or other form of propagated signals, for example, infrared signals, digital signals, etc.; or any other type of media suitable for storing or transmitting information.

Further, it is to be understood that embodiments may include performing operations and using storage with cloud computing. For the purposes of discussion herein, cloud computing may mean executing algorithms on any network that is accessible by internet-enabled or network-enabled devices, servers, or clients and that do not require complex hardware configurations, e.g. requiring cables and complex software configurations, e.g. requiring a consultant to install. For example, embodiments may provide one or more cloud computing solutions that enable users, e.g. users on the go, to configure the access control panel and/or physical access control server on such internet-enabled or other network-enabled devices, servers, or clients. It further should be appreciated that one or more cloud computing embodiments include overriding authorization by any IP enabled readers from using mobile devices, tablets, and the like, as such devices are becoming standard consumer devices.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A physical access method, comprising:
addressing constantly changing physical access needs of entities as said needs evolve using physical access authorization comprising all of identity attributes (WHO), time of the day attributes (WHEN), access point attributes (WHAT), and one or more policies, said physical access authorization:
determining access rights to facilities and physical spaces in real-time each time access is requested by presenting a credential at a facility access point, based on evaluation of each of said WHO, WHEN, and WHAT attributes;
wherein user identity is not tied or programmed to an access name in advance;
wherein user identity is evaluated based on evaluation of each of said identity, time of day, and access point attributes and said one or more policies;
wherein said one or more policies are defined for said user and particular access points that are evaluated in near real-time, each time the user presents the credential at the facility access point; and
wherein said one or more policies comprise a combination of identity and/or user, access point attributes, and a time frame during which access is requested.

2. A method for physical access control, comprising:
performing near real-time policy evaluation with a policy engine comprising policy-based access controls (PBAC) for physical access authorization comprising all of identity attributes (WHO), time of the day attributes (WHEN), access point attributes (WHAT), and one or more policies, and determining access rights to facilities and physical spaces in real-time each time access is requested based on evaluation of each of said WHO, WHEN, and WHAT attributes;

said policy engine:
  receiving data relating to identity attributes and access point attributes from an identity store, and said one or more policies in near real-time;
  obtaining said data from an authorization service each time access is requested;
  addressing constantly changing physical access needs of entities as they evolve;
  using environmental factors and multi-factor authentication to determine said WHO, WHEN, and WHAT attributes when access is requested;
  processing said data against said one or more policies;
  using said processed data to override existing assigned access to a user;
  performing said processing of data and overriding of policy in real-time to grant or deny access to an individual; and
  performing said processing of data and overriding of said one or more policies in near real-time to challenge the user with multi-factor authentication (MFA).

3. The method of claim 2, wherein said data comprises:
  user identity, working shift, and a relationship of a desired access point comprising a door reader to said user's job or duties on day-to-day basis.

4. The method of claim 2, further comprising:
  said policy engine determining whether a user may enter an access point or not based on why the user is accessing said access point; and
  said policy engine checking said one or more policies; and
  denying access upon detecting a conflict with said one or more policies.

5. The method of claim 2, further comprising:
  said policy engine enforcing said policy every time a user tries to access an access point or obtain physical access.

6. The method of claim 2, wherein said environmental factors comprise an added facility policy.

7. The method of claim 6, further comprising:
  with said added facility policy, ensuring that no user is permitted to access to a facility when the facility is deemed unhealthy or unsafe.

\* \* \* \* \*